(12) United States Patent
Wang

(10) Patent No.: US 7,253,377 B2
(45) Date of Patent: Aug. 7, 2007

(54) SYSTEM AND METHOD OF JOINING OVERLAPPING WORKPIECES

(75) Inventor: Pei-Chung Wang, Troy, MI (US)

(73) Assignee: General Motors Corporation, Detroit, MI (US)

(*) Notice: Subject to any disclaimer, the term of this patent is extended or adjusted under 35 U.S.C. 154(b) by 30 days.

(21) Appl. No.: 11/053,687

(22) Filed: Feb. 8, 2005

(65) Prior Publication Data

US 2006/0175315 A1    Aug. 10, 2006

(51) Int. Cl.
*B23K 9/00* (2006.01)
*B23K 26/00* (2006.01)
*B23K 10/00* (2006.01)

(52) U.S. Cl. .............................. 219/137 R; 219/121.63; 219/121.64; 219/121.45

(58) Field of Classification Search ............ 219/137 R, 219/121.63, 121.64, 121.36, 121.45, 121.46, 219/121.59
See application file for complete search history.

(56) References Cited

U.S. PATENT DOCUMENTS

| 4,782,205 | A | * | 11/1988 | Shira | 219/74 |
| 4,891,491 | A | * | 1/1990 | Duley et al. | 219/121.64 |
| 5,821,493 | A | * | 10/1998 | Beyer et al. | 219/121.46 |
| 6,469,277 | B1 | * | 10/2002 | Trube et al. | 219/137 R |
| 6,608,281 | B2 | * | 8/2003 | Ishide et al. | 219/121.78 |
| 6,646,225 | B1 | * | 11/2003 | Wang et al. | 219/121.64 |
| 6,906,281 | B2 | * | 6/2005 | Musselman | 219/121.64 |
| 6,914,213 | B2 | * | 7/2005 | Alips et al. | 219/121.64 |
| 7,015,417 | B2 | * | 3/2006 | Takikawa et al. | 219/121.64 |
| 7,019,256 | B2 | * | 3/2006 | Sonoda et al. | 219/121.63 |
| 2005/0006355 | A1 | * | 1/2005 | De Dinechin et al. | 219/121.63 |

FOREIGN PATENT DOCUMENTS

| JP | 62-263869 | * 11/1987 |
| JP | 10-244369 | * 9/1998 |

OTHER PUBLICATIONS

Krivtsun, I., *Hybrid Laser-Arc Processes In Welding and Material Treatment*, Paton Publishing House, 2002 (Http://www.nas.gov.us/pwj/books/lasarc_e.html).

* cited by examiner

*Primary Examiner*—Kevin P. Kerns

(57) ABSTRACT

An improved fusion welding system having a perforating device and a heating combination is adapted for welding in tandem a set of adjacent overlapping workpieces. The system preferably includes a first laser that perforates the workpieces to produce an opening spaced from the edges; and the combination preferably includes a second laser and electrode for cooperatively melting fusible material into the opening.

15 Claims, 3 Drawing Sheets

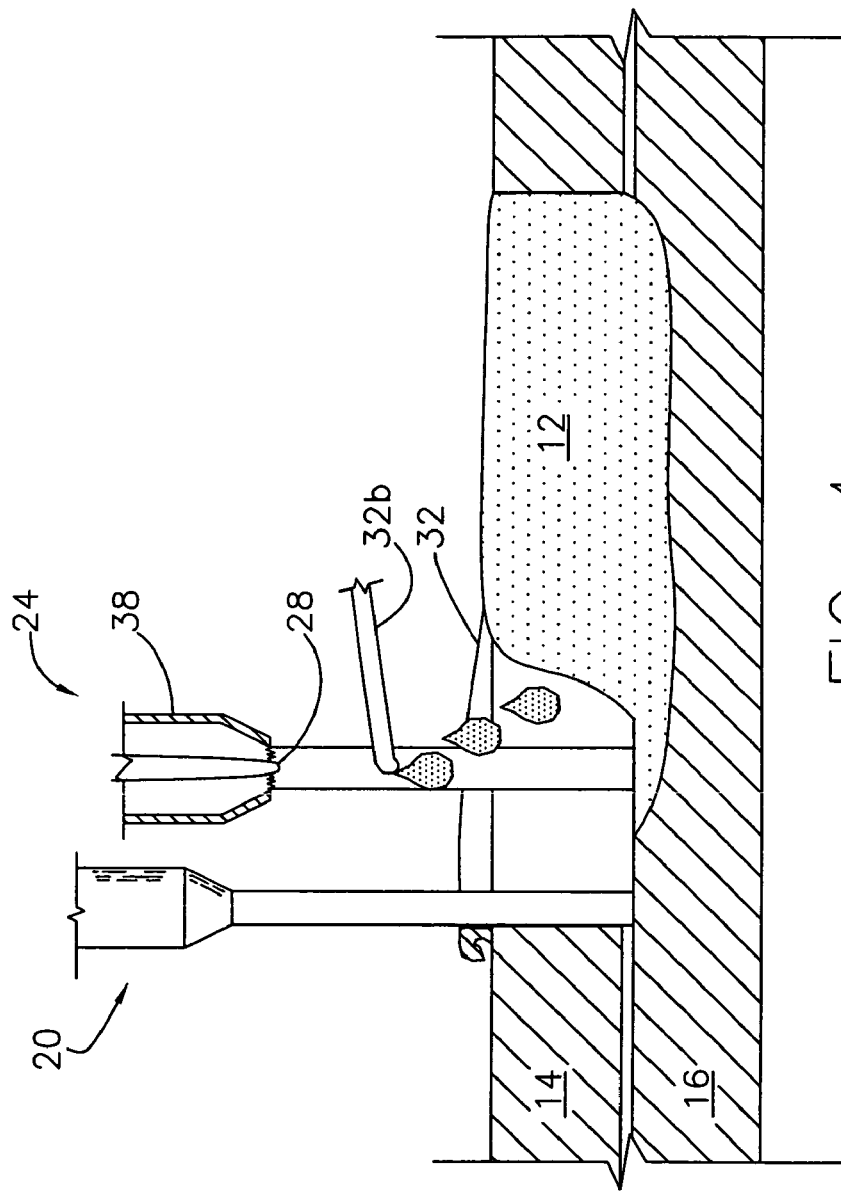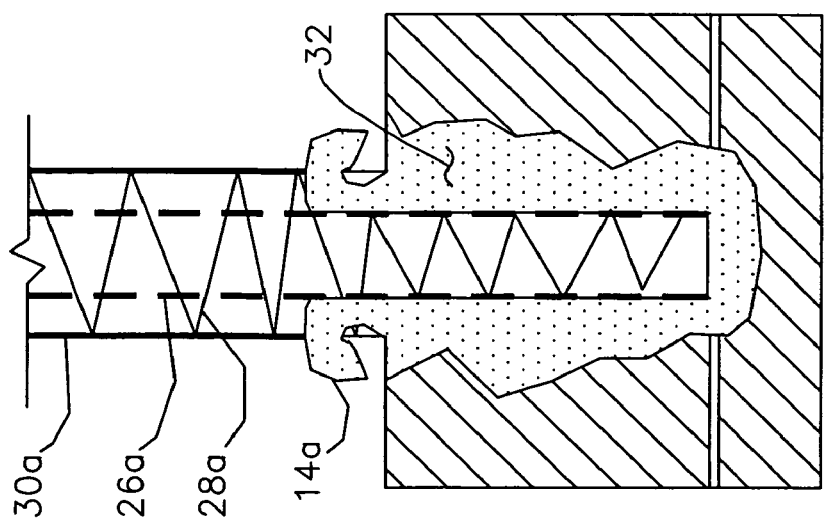

SYSTEM AND METHOD OF JOINING OVERLAPPING WORKPIECES

BACKGROUND OF THE INVENTION

1. Field of the Invention

The present invention relates to fusion welding systems, and more particularly to a fusion welding system having a perforating or cutting device configured to produce an opening within a plurality of workpieces and a heating combination configured to produce a lap weld within the opening.

2. Discussion of Prior Art

The process of material joining and treatment is a necessary condition for the industrial progress. As such, fusion-welding systems have been developed for joining multi-component workpieces. One such system, metal-arc robotic welding, utilizes an arc discharge to provide a more affordable and less expensive heat energy source during joining, and is commonly used, for example, in the automotive industry. These conventional systems are typically used to produce fillet welds along seams formed by adjacent workpieces, as shown in FIG. 1; and provide good gap bridge-ability, weld penetration, and low cost. The electrodes that produce the arc may also be fusible by the process, so that metallic drippings are produced to contribute to the weld. Other welding systems, such as conventional hybrid laser-arc systems, which feature the simultaneous application of heat generated from laser radiation and an electric arc, have also been developed.

Due to workpiece dimension variations, improper fixture designs, and distortions from welding, however, weld bead misalignment (also shown in FIG. 1) presents a major issue during the use of these and other systems. Although various seam tracking devices have been used, they have not been successful due in part to long cycle time, arc lighting interference with camera and other technical difficulties. As a result, part inspection and repair provisions have been added to the production process, which thereby increase production time and total man-hours.

The increase in costs associated therewith, results in a need in the art for a more efficient welding process that reduces the likelihood of weld misalignment.

BRIEF SUMMARY OF THE INVENTION

Responsive to these and other concerns caused by conventional fusion welding systems, the present invention provides an improved system for increasing the consistency and alignment of weld bead placement, and thereby reducing the costs associated with inspection and repair of weld misalignment. This invention provides a method of welding overlapping workpieces using multiple sources for in tandem perforation and welding.

More particularly, a first aspect of the present invention concerns a system for welding a plurality of overlapping adjacent workpieces to form a lap weld, wherein each work-piece presents an outer edge. The system includes a perforating device configured to engage at least a portion of the plurality of workpieces, so as to produce an opening in the portion. The system also includes a heating combination configured to heat a zone adjacent the opening to a minimum zone temperature, so as to cause a weld to form at least predominately within the opening. Finally, the opening is adjacent to and spaced from the outer edges of each of the plurality of workpieces.

A second aspect of the present invention concerns a method of welding a plurality of workpieces to form a lap weld, and includes the following steps. First, a portion of the workpieces is perforated to produce an opening adjacent to and spaced from the edges of each of the workpieces. Next, an arc is created adjacent an outermost surface of the workpieces, and a first laser beam is directed into or next to the arc, so as to form a hybrid laser-arc column and release heat energy sufficient to heat a zone adjacent the opening to a minimum Zone temperature. Then, a fusible material having a melting range less than or close to the minimum zone temperature is positioned within the zone, so that the material flows into the opening and contacts each of said workpieces as it melts. Finally, the molten material is cooled to a temperature less than the melting range and allowed to re-solidify.

Other aspects and advantages of the present invention will be apparent from the following detailed description of the preferred embodiment(s) and the accompanying drawing figures.

BRIEF DESCRIPTION OF THE SEVERAL VIEWS OF THE DRAWING

A preferred embodiment of the invention is described in detail below with reference to the attached drawing figures, wherein:

FIG. 3c is a fragmentary cross-sectional view of the formation of a weld in accordance with a preferred embodiment of the present invention, particularly illustrating section A-A shown in FIG. 3b; and FIG. 4 is a cross-sectional elevation view of a preferred embodiment of the system; particularly illustrating a heating combination including a plasma electrode system.

DETAILED DESCRIPTION OF THE INVENTION

Figure 1:
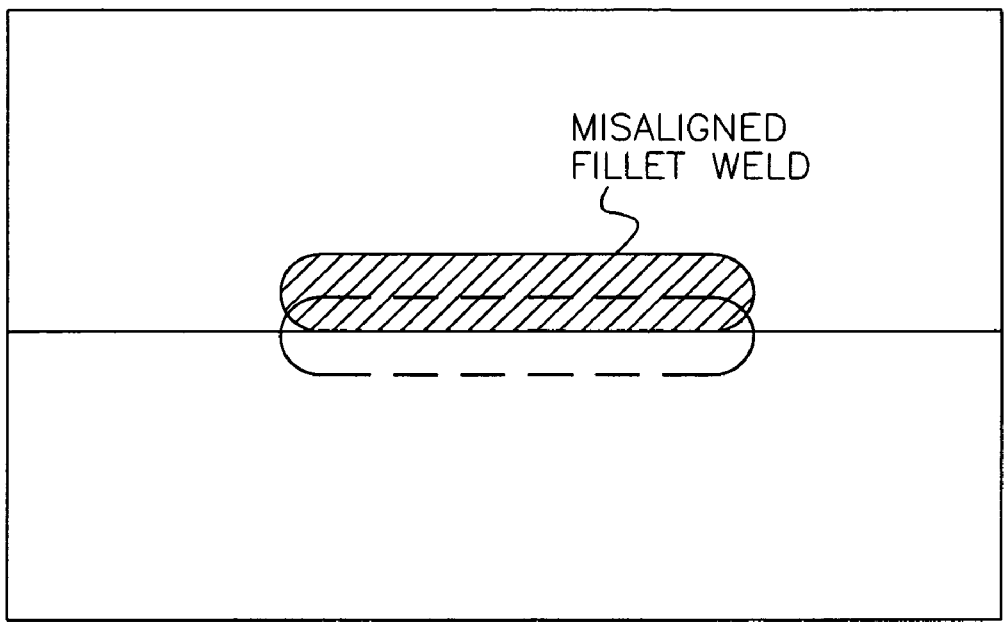
FIG. 1 is a top view of a misaligned fillet weld resulting from a conventional system, particularly illustrating proper alignment in hidden line type.
Figure 2:
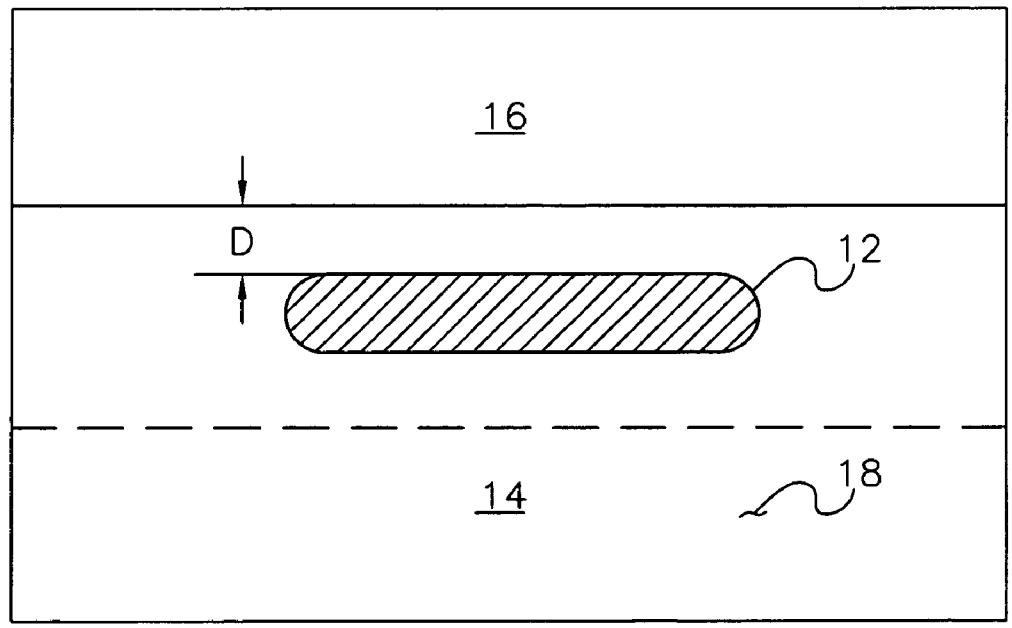
FIG. 2 is a top view of a plurality of workpieces in overlap configuration and a lap weld.

The present invention concerns an improved fusion welding system 10 for welding a plurality (i.e., two or more) of overlapping adjacent workpieces, such as automotive sheet metal and engine cradle parts, to produce a lap weld 12. In the illustrated embodiments shown in FIGS. 3a,b and 4, a plurality of two workpieces 14,16 of equal thickness are shown; however, the system 10 may be utilized to weld a greater plurality or structural components having variable thickness. The workpieces may be formed of a wide range of materials including iron alloys, aluminum alloys, magnesium alloys, titanium and molybdenum. As best shown in FIG. 2, the positioned workpieces 14,16 present at least one outermost surface 18 that defines in part an outer edge and is exposed to the system 10. Although described herein with respect to workpieces, it is well within the ambit of the present invention for the system 10 to be used in other ways, wherein repair or welding is desired, such as patching an existing structure.

Turning to the configuration of the system 10, a perforating device 20 is provided for perforating a portion of the workpieces 14,16 so as to create an opening 22 therein. A heating combination 24 follows the device 20 and is operable to melt fusible material, preferably metal, adjacent or near the opening 22, so that the opening is filled by the molten material. The device 20 and combination 24 may be manually controlled, or controlled by electro-mechanical means (not shown). More preferably, the system 10 is robotically controlled along multi-axes and is programmably adjustable.

As shown in FIGS. 2 through 4, the device 20 is linearly translatable with respect to the workpieces 14,16 and is operable to cut a continuous slot opening through the portion. The perforated portion consists of at least each succeeded workpiece so that the preferred opening 22 is adjacent each of the workpieces. The preferred device 20 is further configured to space the opening 22 from the outer edges of the workpieces a distance, D, greater than the axial tolerance of either workpiece 14,16, and more preferably greater than the maximum tolerance plus 1 cm. Thus, the overlap between the workpieces preferably: presents a minimum width not less than 2D plus the lateral width of the opening.

Figure 3A:
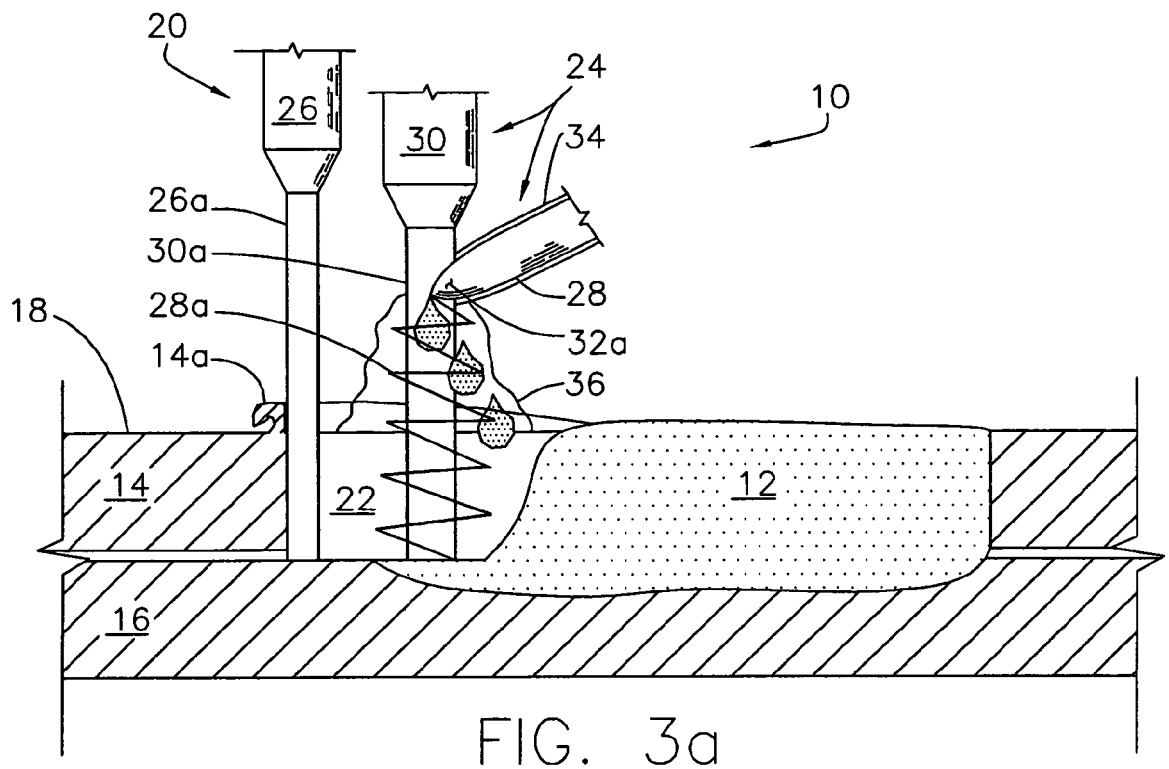
FIG. 3a is a cross-sectional elevation view of a preferred embodiment of the system, particularly illustrating a heating combination including a fusible electrode and laser.
Figure 3B:
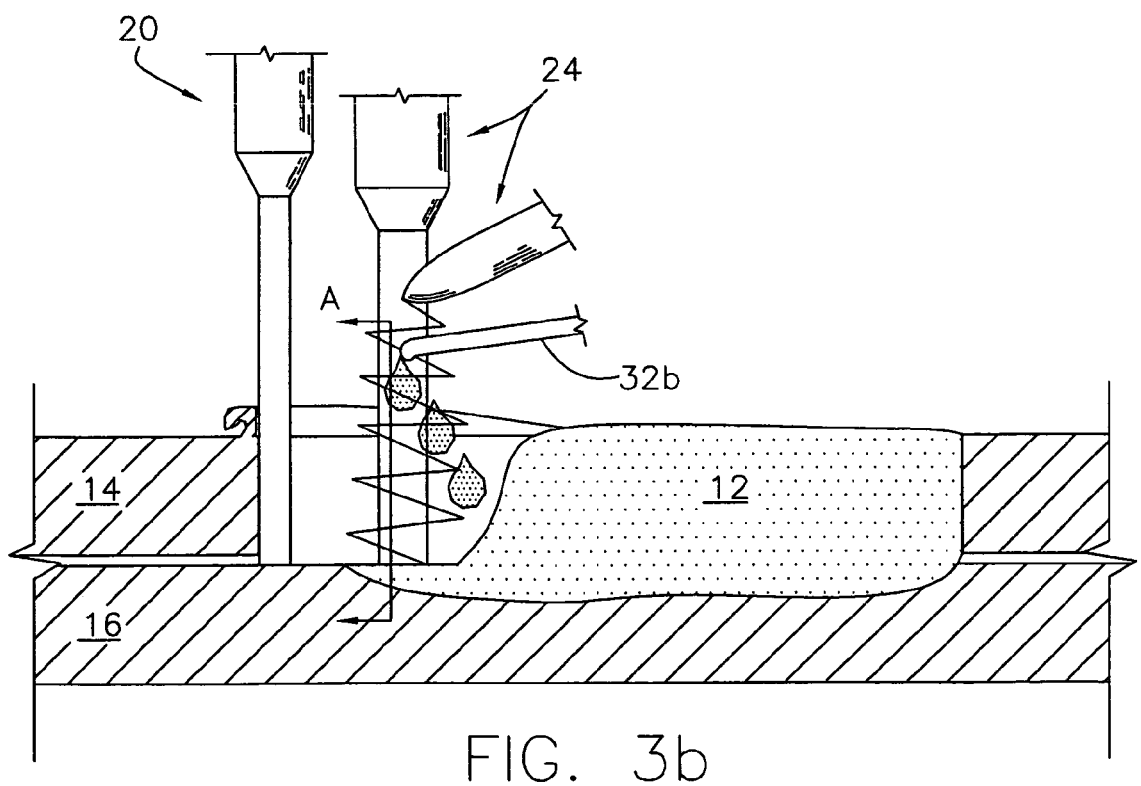
FIG. 3b is a cross-sectional elevation view of a preferred embodiment of the system; particularly illustrating a heating combination including an electrode, laser, and fusible rod.

As further shown in FIGS. 3*a,b*, the preferred device 20 includes a first laser 26. The laser 26 engages the outer surface 18 with a laser beam 26*a* having appropriate power to perforate the portion. More preferably, the laser 26 is configured to produce a variable power output not to exceed 10 kW. The beam 26*a* perforates the portion by a combination of spawling and compression, which results in extruded material 14*a* being presented along the perimeter of the opening 22. While other perforating devices can be utilized, such as drills and punching mechanisms, it is appreciated by those ordinarily skilled in the art that the laser beam 26*a* provides precise and consistent conventional means for perforating the workpieces as desired.

After the laser beam 26*a* passes, the heating combination 24 is directed along the opening 22 at an energy level sufficient to heat a zone adjacent, and more preferably encompassing, the opening 22 to a minimum zone temperature. The preferred combination 24 includes an electrode 28, a second laser 30, and fusible material 32 having a melting range less than or close to the minimum zone temperature, such as an aluminum, aluminum alloy, magnesium alloy, copper, or copper alloy filler rod 32*b* (see, FIG. 3*b*). As shown in FIGS. 3*a,b*, the electrode 28 is configured to form an electric arc 28*a* between the workpieces 14,16 and electrode 28. The heat generated by the arc 28*a* extends to its full depth into the workpieces 14,16, so as to heat the full depth simultaneously. A suitable process for use in this configuration is more commonly known as Tungsten Inert Gas (TIG) welding, which utilizes a non-consumable tungsten electrode to form the arc, and feeds gas (i.e., Argon, Argon/Helium, or Argon/Hydrogen combination) to shield the arc and weld pool from outside reactants.

The second laser 30 is configured to direct a second laser beam 30*a* towards the outer surface 18 and into the zone of influence of the arc 28*a*. More preferably, the beam 30*a* is directed into or close to the arc 28*a*, as is typical in hybrid laser-arc welding processes, wherein it is appreciated that the hybrid combination produces greater welding efficiency than the sum of its parts. The electric arc heating of the material 32 increases the thermal absorptiveness of the material 32, and therefore the effectiveness of the laser beam 30*a*. The arc 28*a* and beam 30*a* combination also improves the stability and productivity of the arc 28*a*. Finally, the combination also causes a change in the entire energy balance of the arc 28*a* and spatial distribution of the beam 30*a*, which cooperatively provide extra energy.

More preferably, as shown in FIG. 3*a*, the electrode 28 and at least a portion of the material 32 are integrally formed to present a fusible distal portion 32*a* of the electrode, that melts during the welding process. In this configuration, the electrode 28 is positioned so that the drippings fall into the opening 22 to fill the slot. A suitable process for use in this configuration is commonly known as Gas Metal Arc welding (GMAW). Most preferably, a covered electrode having a protective outer coating 34 comprising material (e.g., cellulose, Calcium fluoride, etc.) configured to form a protective shield 36 over the arc upon disintegration is utilized.

The preferred workpieces 14, 16 are fusible by the heated zone in lieu of or addition to the provision of outside fusible material 32*a,b*, so that the heating combination 24 is operable to melt a separate portion of the workpieces 14,16 adjacent the opening 22 (see, FIG. 3*c*). As alternatively shown in FIGS. 3*a,b*, drippings from the fusible portion 32*a* of the electrode 28, or the fusible filler rod 32*b*, can be further intermixed with the molten workpiece material to fill the opening 22. However, it is certainly within the ambit of this invention to utilize drippings from both a fusible electrode and a filler rod during the process.

As further shown in FIG. 3*c*, the second beam 30*a* preferably presents a broader diameter than does the perforating beam 26*a*, and more preferably a diameter approximately equal to twice the diameter of the perforating beam 26*a*, so that the beam 30*a* directly engages the workpiece 14, including the extruded material 14*a*. Finally, after the heating combination 24 passes, the weld pool is cooled by the surrounding unheated material and atmosphere to solidify and form a lap weld 12 having an aggregate tensile strength.

Alternatively, the combination 24 may include other conventional welding processes, such as the plasma-arc welding process shown in FIG. 4. In this configuration, the electrode 28 is coaxially aligned with and spaced from a first end of a conductive sleeve 38, and configured to cooperatively form an arc therebetween. The sleeve 38 is fluidly coupled to a gas source (not shown), so that the source, electrode 28, and sleeve 38 are cooperatively configured to direct a gaseous stream through the arc, and produce a plasma column between the electrode 28 and outer surface 18. Also shown in FIG. 4, a fusible rod can be placed at least near the plasma column to provide filler material as previously described. A second laser beam (also not shown) can be configured to interact with the zone of influence of the plasma column to result in increased efficiency similar to the aforementioned TIG and GMAW combinations.

Suitable first and second lasers 26, 30 to be used in the present invention may include YAG lasers pumped using laser diodes. It is appreciated that these lasers are more energy efficient and require less maintenance than conventional flash-lamp pumped lasers. It is further appreciated that higher power (i.e. 4 to 10 kW) continuous wave (CW) Nd: YAG lasers are capable of welding materials 0.8 mm (car body steel) to 15 mm (ship steel) in thickness. Each of the lasers 26, 30 may also be a $CO_2$ or fiber laser, preferably with a 2 to 8 kW power output, and an individual or simultaneous processing capacity.

The laser beams 26*a*,30*a* may be produced by a single laser and delivered via fiber optic conduit and in conjunction with articulated arm robots, in order to work on components of complex shape. The laser beams 26*a*,30*a* may also be split from a single initial laser beam created by the single laser, and configured such that the second laser immediately follows the first. Finally, a plurality of devices 20 and combinations 24 may be interconnected and simultaneously operable, so as to concurrently weld an equal plurality of sets of workpieces.

Thus, a preferred method of welding a plurality of workpieces to produce a lap weld is presented, and includes the following steps. First, a portion of the workpieces is perforated by a laser beam to produce an opening adjacent to and spaced from the edge of each work-piece. Next, an electric arc is created adjacent an outermost surface of the workpieces, and a second laser beam is directed into or close to the arc, so that a hybrid laser-arc column is formed and heat energy sufficient to heat a zone adjacent the opening to a minimum zone temperature is released. A fusible material having a melting range less than the minimum zone temperature is then positioned within the zone, and more preferably spaced directly above the opening, so that the material flows into the opening and contacts each of said workpieces as it melts.: Finally, the molten material is cooled to a temperature less than the melting range and allowed to re-solidify. The laser beams may be emitted from separate first and second lasers, or may be split from an initial laser beam emitted from a single source.

Obvious modifications to the exemplary embodiments and methods of operation, as set forth herein, could be readily made by those skilled in the art without departing from the spirit of the present invention. As used herein, the term "plurality" shall mean two or more. The inventor hereby states his intent to rely on the Doctrine of Equivalents to determine and assess the reasonably fair scope of the present invention as pertains to any system not materially departing from but outside the literal scope of the invention as set forth in the following claims.

What is claimed is:

1. A welding system adapted for welding a plurality of overlapping adjacent workpieces to form a lap weld, wherein each workpiece presents an outer edge, said system comprising:
   a perforating device configured to engage at least a portion of the plurality of workpieces, so as to produce an opening cooperatively defined by each of the workpieces; and
   a heating combination including a plurality of separate and concurrently functionable welding elements,
   said elements being oriented relative to the device, and configured to cooperatively and contemporaneously heat a zone adjacent the opening to a minimum temperature, so as to cause the weld to form at least predominately within the opening,
   said opening being adjacent to and spaced from the outer edge of each of said plurality of workpieces,
   said combination further including an electrode, wherein said electrode is coaxially aligned with and spaced from a first end of a conductive sleeve,
   said electrode and sleeve being cooperatively configured to form an electric arc between the first end and electrode,
   said sleeve being fluidly coupled to a gas source, so that the source, electrode and sleeve are cooperatively configured to direct a gaseous stream through the arc, and produce a plasma column between the electrode and an outermost surface of the plurality of workpieces.

2. The system as claimed in claim 1; and
   a fusible member, at least a portion of which is positionable within the zone and has a melting range less than the minimum zone temperature, so that the combination is operable to melt said portion of the member into the opening.

3. The system as claimed in claim 2,
   said member being formed of material selected from the group consisting essentially of aluminum, aluminum alloy, magnesium alloys, copper, and copper alloys.

4. A welding system adapted for welding a plurality of overlapping adjacent workpieces to form a lap weld, wherein each workpiece presents an outer edge, said system comprising:
   a perforating device including a first laser configured to focus at least one laser beam having a first width, and power output not less than 4 kW upon an outermost surface of said plurality of workpieces, so as to produce an opening cooperatively defined by each of the workpieces, wherein said opening is adjacent, and spaced from the outer edges of, each of said plurality of workpieces;
   a heating combination including a second laser beam having a second width greater than the first width, and an electrode, wherein the second laser beam and electrode are cooperatively configured to heat a zone adjacent the opening to a minimum zone temperature; and
   a fusible member, at least a portion of which is positionable within the zone and has a melting range less than the minimum zone temperature, so that the combination is operable to melt the portion of the member into the opening,
   said electrode being spaced from and cooperatively configured to form an arc between the electrode and an outermost surface of the plurality of workpieces,
   at least a portion of the second laser beam being directed through at least a portion of the arc, such that at least a portion of the arc and second laser beam are coextensive, directed coterminatively towards the outermost surface, and cooperatively form a hybrid laser-arc column.

5. The system as claimed in claim 4,
   said first laser being either a YAG or $CO_2$ laser.

6. The system as claimed in claim 4,
   said combination being further configured to produce a gaseous shield, wherein the shield presents a tubular configuration extending from an outermost surface of the workpieces to the electrode and envelops the arc, so that the arc is generally separated from ambient air conditions.

7. The system as claimed in claim 4,
   said electrode and fusible member being an integral unit, such that the electrode presents a fusible distal section.

8. The system as claimed in claim 4,
   said combination and workpieces being cooperatively configured to melt a fusible portion of the workpieces adjacent the opening into the opening.

9. A method of welding a plurality of workpieces to form a lap weld, said method comprising:
   (a) perforating a portion of the workpieces to produce an opening adjacent to and spaced from the edge of each workpiece;
   (b) creating an arc having a first welding efficiency adjacent an outermost surface of the workpieces, and directing a first laser beam having a second welding efficiency into the arc, so that the arc and second laser beam are directed coterminatively towards the outermost surface, cooperatively form a hybrid laser-arc column having a third welding efficiency greater than the sum of the first and second welding efficiencies, and release heat energy sufficient to heat a zone adjacent the opening to a minimum zone temperature after the workpieces have been perforated and the opening produced;
   (c) positioning within the zone a fusible material having a melting range less than the minimum zone temperature, so as to produce molten material that flows into the opening and contacts each of said workpieces; and (d) cooling said molten material to a temperature less than the melting range and allowing the material to re-solidify.

10. The method as claimed in claim 9,
step (c) further including the step of securing the fusible material a minimum distance from the workpieces, so as to space the material therefrom.

11. The method as claimed in claim 9,
step (a) further including the step of directing a second laser beam to said portion to perforate the portion and produce the opening.

12. The method as claimed in claim 11, wherein said first and second laser beams are generated from a YAG, $CO_2$, or fiber laser beam source.

13. The method as claimed in claim 11,
steps (a) and (b) including the further steps of utilizing a single source to create the first and second laser beams.

14. The method as claimed in claim 13, wherein the first and second laser beams are split from an initial laser beam.

15. The method as claimed in claim 9, wherein multiple steps (a) through (d) are performed concurrently with respect to multiple sets of workpieces, so as to produce multiple lap welds.

* * * * *